United States Patent
Baskis et al.

[19]

[11] Patent Number: 6,109,123
[45] Date of Patent: Aug. 29, 2000

[54] ROTATIONAL INERTIAL MOTOR

[76] Inventors: Paul T. Baskis, 339 S. Centiury Blvd.; F. David Mullinix, 405 Marco, both of Rantoul, Ill. 61866

[21] Appl. No.: 09/153,663

[22] Filed: Sep. 15, 1998

[51] Int. Cl.⁷ .............................. F16H 27/02; G05G 1/00
[52] U.S. Cl. ......................... 74/89.1; 74/DIG. 9; 74/572
[58] Field of Search ................. 74/DIG. 9, 572, 74/84 R, 84 S, 89.1; 185/27, 33; 310/81, 74

[56] References Cited

U.S. PATENT DOCUMENTS

| | | | |
|---|---|---|---|
| 3,015,054 | 12/1961 | Thoma | 318/47 |
| 3,534,203 | 10/1970 | Sommeria | 310/14 |
| 3,653,269 | 4/1972 | Foster | 74/84 R |
| 3,983,426 | 9/1976 | Kilmer | 310/46 |
| 4,458,167 | 7/1984 | Leveille | 310/166 |
| 5,030,866 | 7/1991 | Kawai | 310/82 |
| 5,233,251 | 8/1993 | Nehmer | 310/157 |
| 5,685,196 | 11/1997 | Foster, Sr. | 74/84 R |
| 5,921,133 | 7/1999 | Tarnopolsky | 74/DIG. 9 |

FOREIGN PATENT DOCUMENTS

| | | | |
|---|---|---|---|
| 2298-709 | 1/1975 | France | 74/DIG. 9 |
| 52-4952 | 1/1977 | Japan | 74/DIG. 9 |

*Primary Examiner*—David A. Bucci
*Assistant Examiner*—Colby Hansen
*Attorney, Agent, or Firm*—Pennie & Edmonds LLP

[57] ABSTRACT

An inertial motors utilizes a smoothly coordinated circular motion and converts the motion of circulating weights into a unidirectional series of impulses that drive a vehicle forward. Weights located on an armature are guided on tracks along radial paths from center of the armature. The position of the weights is controlled electromagnetically by solenoids. The solenoids are energized and de-energized at stations along their circular route in such a manner as to transfer linear momentum to the axis to the armature.

6 Claims, 4 Drawing Sheets

6,109,123

ROTATIONAL INERTIAL MOTOR

FIELD OF THE INVENTION

This invention relates to inertial motors for providing locomotion to a vehicle by the organized motion of structures internal to the vehicle. In particular it relates to motors that convert the kinetic energy of circular motion into the kinetic energy of linear motion.

BACKGROUND OF THE INVENTION

Conventional motors for propelling a vehicle typically employ a drive shaft that, through a transmission, engages wheels having frictional contact with a road surface. The energy source that powers the vehicle thus provides a force that bears upon the road surface and causes the road surface to react with a frictional force that accelerates the vehicle. Alternatively, a jet or rocket motor utilizes an energy source to expel a fluid at high momentum in one direction. The jet or rocket powered vehicle reacts to the loss of momentum by gaining momentum in the opposite direction or using the momentum transfer to overcome frictional forces. Propeller driven vehicles combine both techniques by using a drive shaft to rotate a propeller that imparts momentum to an external fluid. In reaction, the vehicle moves in the direction opposite to the direction of motion of the fluid.

Inertial motors derive an instantaneous motion by the internal transfer of momentum among the components of the vehicle. As momentum is imparted to an internal component the remainder of the vehicle reacts by gaining momentum in the opposite direction. U.S. Pat. No. 5,685,196 has provided for a linear system in which a mass is accelerated opposite to the direction of motion of the vehicle, imparting momentum to move the vehicle forward. The vehicle is then temporarily anchored to the ground while the mass is returned to its initial position. The anchoring to the ground prevents the vehicle from simply oscillating and returning to its initial position. The result is a jerky motion of the vehicle forward. In FIG. 1C of the '196 patent an electromagnetic version is proposed.

FIGS. 5A and 5B of the '196 patent show a rotary adaptation. Here, weights 50 are advanced by actuators and springs or by grooved cylinders 90 mounted on a disk 91. In both these examples it appears that the weights 50 are centrally pivoted, by which it is understood that the center of gravity of the weight is moved tangentially but not radially.

BRIEF DESCRIPTION OF THE INVENTION

The present invention overcomes the limitations of prior inertial motors by utilizing a more smoothly coordinated circular motion and converting the motion of circulating weights into a unidirectional series of impulses that drive the vehicle forward. In order to prevent oscillation of the vehicle there is a rachet mechanism to prevent the regression of the vehicle. Because of the generally circular motion of the driving weights it is possible to average out the impulses and move the vehicle forward.

The inertial motor comprises a power source to maintain an armature in a state of rotation at an approximately uniform angular velocity. Weights are located on the armature and are guided on tracks that limit their motion to radial paths from center of the armature. The position of the weights along their respective radial tracks is controlled by a controller that operates electromagnetically upon drivers comprising solenoids powered from generator coils, which are energized by a stationary field similar to a present day self exciting generator. In a preferred embodiment the solenoids are energized and de-energized at stations along their circular route. This is coordinated in such a manner as to transfer the maximum linear momentum to the axis of the armature. An arbitrarily large number of weights may be organized in this manner. In one embodiment used for illustrative purposes four weights are implemented.

To restrain the vehicle from any merely oscillatory motion a ratchet is connected to the wheels of the vehicle that allows it to move in only one linear direction. (Similarly, if the invention were not implemented in a land vehicle, the "ratchet" could be provided by a subsidiary jet or prop engine for a plane or a rocket for a space vehicle. In either event, the subsidiary motion restraining component will be referred to as a ratchet.) The inventor believes that this ratchet is not an essential component of the invention and that an embodiment lacking the ratchet would be preferred, but, as he has not yet constructed such an embodiment he takes the conservative position that the absence of the ratchet is not an essential feature for the practice of the invention.

DETAILED DESCRIPTION OF PREFERRED EMBODIMENTS

The invention is best described in connection with the figures.

The Inertial Drive Unit of the present invention utilizes the reaction of an apparatus to a longitudinal component of a radial acceleration of rotating masses internal to the apparatus. In particular the invention directs along a linear path the reaction to internal radial accelerations of masses driven in a circular motion and thereby creates a reaction force that moves the apparatus in a direction perpendicular and away from the axis of rotation of the internal constituents of the apparatus.

Figure 1:
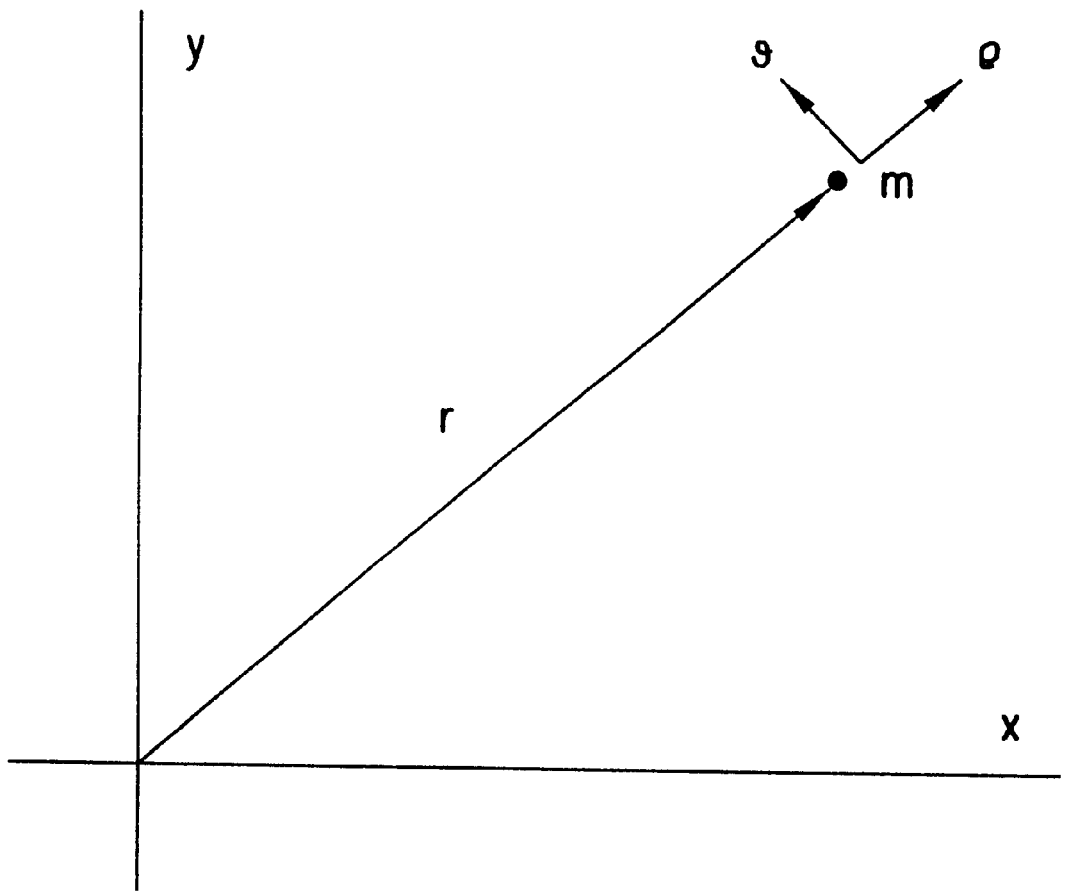
FIG. 1 depicts the coordinates used to describe a moving mass in a system of polar coordinates.

The theoretical basis for the reaction force is shown in FIG. 1, where the acceleration of a point particle 1 having a mass m at a distance r from the center $\bigcirc$ of an inertial coordinate system x-y is depicted. The vector from $\bigcirc$ to the mass m may be expressed in polar coordinates as $$r = r\, \rho,$$

where bold characters represent vectors and bold latin characters represent unit vectors. These polar coordinates are stationary, i.e. those of an inertial frame, and are not to be confused with a system of coordinates in inform rotation. r is the magnitude of the vector r. Differentiation with respect to time gives $$v = v\ \rho + r\ \omega\theta$$

where v is the vector velocity of the mass, ω is the scalar angular velocity of the mass about O, and θ is a unit vector orthogonal to r (or ρ) in the direction rotation of the mass about O. This follows from the fact that $$d\rho/dt = \theta d\theta/dt,$$

where θ is the magnitude of the angle between r and a longitudinal direction, which may be thought of as the x axis.

Differentiating again with respect to time gives the following expression for the vector acceleration of the mass:

$$a = (a - r\ \omega^2)\ \rho + (2\ v\ \omega + r\ \alpha)\ \theta,$$

where a is the scalar radial acceleration $d^2r/dt^2$, and α is the scalar angular acceleration $d^2e/dt^2$.

These four accelerations are usually referred to respectively as the radial acceleration, the centripetal acceleration, the Coriolis acceleration, and the angular acceleration. Each of these accelerations causes an apparent reaction force F=−m a, where the minus sign express the fact that the accelerations are sensed in a rotating system as a reaction. Thus there are present inertial forces termed, respectively, the radial acceleration force, the centrifugal force, the Coriolis force, and the angular acceleration force. The prior art utilized an embodiment in which both a and v were zero and relied upon ω and α for its effects. The present invention relies primarily upon the radial acceleration force a and the Coriolis force 2vω (i.e. the forces due to the radial motion of masses) for its effect.

Figure 2:
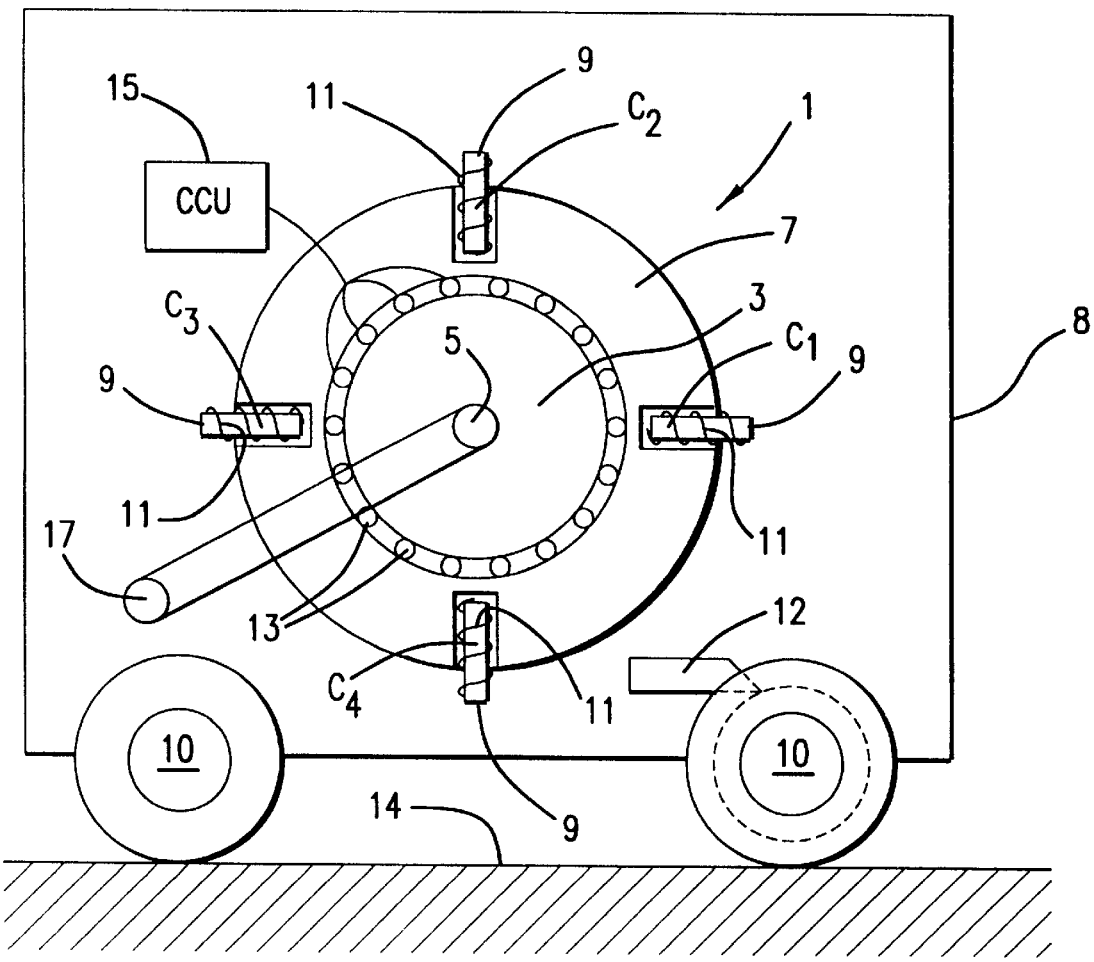
FIG. 2 is a plan view of the rotor and stator components of the present invention.
Figure 3:
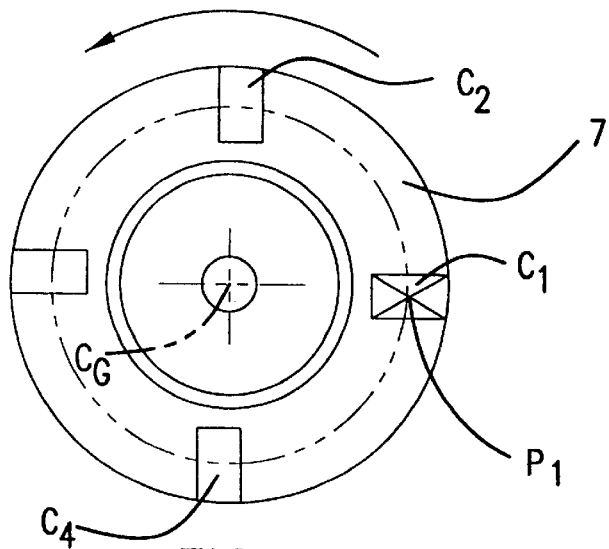
FIG. 3 depicts the location of the solenoid plungers with respect to the rotor and stator.

The Inertial Drive Unit 1 in a preferred embodiment has several components. As shown in FIG. 2, a stator 3 is fixed to an axle 5 about which a rotor 7 is capable of rotation. Four solenoids which are labeled $C_1$, $C_2$, $C_3$ and $C_4$ are attached to the rotor. The stator and rotor are circular in shape, are concentric about the axle, and lie in a plane perpendicular to the centerline of the axle. The four solenoids are arranged at 90° angles from one another as seen from the axle. Different numbers of solenoids are also possible, with, in general, the solenoids being symmetrical distributed about the axis forming the corners of a regular polygon. For example, five solenoids may be arranged in a pentagon, six in a hexagon, etc. The solenoids each comprise plungers 9, which are moved along the axis of the solenoids in response to electrical currents through solenoid electromagnet coils 11 of the solenoid. A stationary field coil assembly 13 is located on the stator 3 consisting preferably of 18 individual stator coils of the coil stationary field assembly that power the solenoid electromagnets by electromagnetic induction. A computer control unit 15 is connected to each of the coils of the coil stationary field assembly 13.

The inertial drive unit 1 in one embodiment is connected to a vehicle 8, having wheels 10 which ride on a surface 14. The wheels are constrained to turn in only one direction by a ratchet 12.

In operation, the Inertial Drive Unit (IDU) sets the computer control system 15 so that all of the field coils 11 of the coil stationary field assembly are all energized and the rotor 7 is made to spin about its axis 5 by the motor 17. The motor is preferably located at the center line of the axle of the stator 3, but for clarity of the figures it is shown as driving the rotor through operation of a drive belt 19 in an alternative embodiment. Once the rotor 7 is brought up to operating speed of a specific angular velocity ω, the field coils 11 are energized, the generator coils 13 are producing voltage and the plungers of the solenoids ($C_1$, $C_2$, $C_3$ and $C_4$) will be held in the closest possible position to the axis of the rotor 5, which is drawn in as shown in FIG. 2. The solenoids are the only load on the generator coils.

Figure 4:
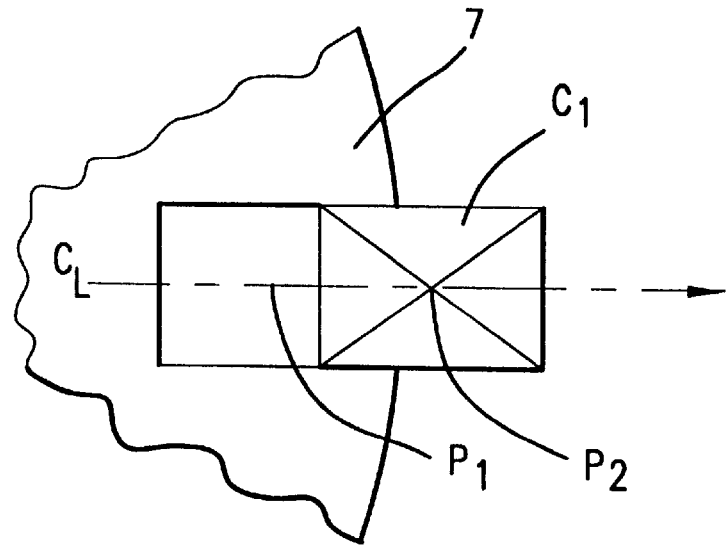
FIG. 4 is a partial view of a solenoid with its plunger in an extended position.

The magnetic force of the electromagnets which hold the solenoid plungers in position is now the source of the centrifugal and Coriolis forces as the masses accelerate inwardly and achieve their inward position. In FIG. 4 the solenoid plunger ($C_1$) has two lines crossing through it indicating $P_2$, the location of the center of mass of the solenoid plunger before it is drawn inwardly to the position at $P_1$. The center of gravity of the IDU before any of the plungers are drawn inwardly is located at the center line of the axle, as is the center of gravity of the IDU when all of the weights are drawn inwardly.

When desired, any one of the field coils about the axle of the stator 3 can be de-energized. The de-energization of the field coils determines the direction to which the center of gravity of a vehicle using the inertial motor will be displaced. This will cause the generator coils to quit producing voltage at that field coil point, cutting off the current flow to the coils of the solenoid ($C_1$) allowing the solenoid plunger to accelerate, obtaining linear speed which is expressed as v=ωr; where v=linear speed; r=the instantaneous radius of the solenoid plunger from the axis of the rotor; and ω=the angular velocity of the rotor. The distance by which the solenoid plunger ($C_1$) moves as it is guided by the cylinder, radially outward from the axis of the rotor is measured to any point along the center line of travel of the solenoid cylinder or until the solenoid plunger reaches the furthest point possible from the axis of the rotation which is $P_2$, as shown in FIG. 4.

Figure 5:
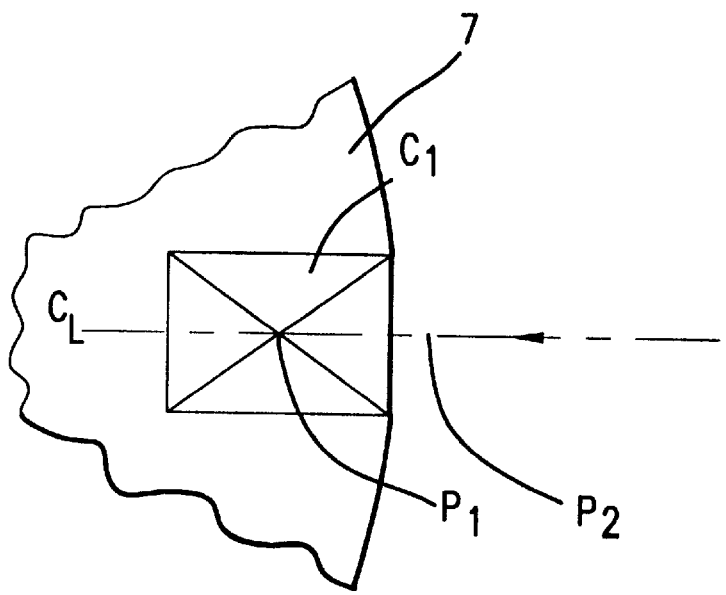
FIG. 5 is a partial view of a solenoid with its plunger in an retracted position.

Immediately after the generator coils pass a field coil which is associated with a solenoid ($C_1$) and enter the magnetic field of the next field coil, the generator coils induce voltage flow/current flow into the solenoid's coils, which being the only load are re-energized causing the solenoid plunger ($C_1$) to draw back to the point $P_1$ in opposing the centrifugal and Coriolis force as shown in FIG. 5. As a result the moment of inertia about the center of the axis, (m $r^2$) of the solenoid plunger ($C_1$) decreases and remains constant within the plane of the rotor as the center of gravity of the IDU is displaced towards the center of mass of the solenoid plunger. This causes a change in the angular momentum of the mass, m $r^2$ ω, resulting in reactive torques upon the mass of the plunger, that provide the Coriolis forces, and centrifugal forces that oppose the decrease in centripetal acceleration.

We now have to consider the coordination of the motion of the plungers with respect to one another. As the rotor continues to rotate, the solenoid ($C_2$), which is in the desired inward position, rotates into the proximity of the de-energized field coil causing the plunger of solenoid ($C_2$) to move in the same manner as the previous plunger of solenoid ($C_1$). This sequence of events will occur as each solenoid moves into the same position as the last until the operator chooses to change the sequence of activation. Any number and combination of solenoids/pistons can be activated in any sequence desired and at any degree of rotation of the rotor.

As an example, a preferred embodiment of the invention has the following dimensions and parameter values: The stator 3 which includes the axle and other necessary static components can be characterized as being approximately 80 mm in diameter, a mass of the plunger (m) equal to approximately 0.5 kg; and an angular velocity ω equal to 2000 rpm, i.e. 33.33 rps. The rotor 7, which includes the four solenoids and other necessary components mentioned above can be approximately 160 mm in radius. The mass (m) may equal to 4.55 kg.

As stated above the operation of the Inertial Drive Unit (IDU) begins when the computer control system is set so that all of the field coils are energized and the rotor 7 starts spinning about its axis, which is located at the center line of the axle of the stator 5, by use of a conventional motor. The rotor 7 is brought up to operating speed of a specific angular velocity which for this scenario is 33.33 rps. The plungers of the solenoids ($C_1$, $C_2$, $C_3$ and $C_4$) are held in the nearest possible position $P_1$ to the axis of the rotor against the centrifugal force (as observed outside the inertial frame), when the electromagnets are energized.

When desired any one of the field coils about the axis of the stator 3 can be de-energized, causing the generator coils to cease producing voltage at that field coil point, cutting off the current flow to the solenoid ($C_1$) allowing the plunger of that solenoid to accelerate. The magnitude of the of the centrifugal force is 7017.0 N outward from the axis of the rotor. Immediately after the generator coils pass that field coil which is associated with the solenoid ($C_1$) and enter the magnetic field of the next field coil, the generator coils induce voltage flow/current flow into the solenoid, which being the only load are re-energized causing the plunger of the solenoid ($C_1$) to accelerate, drawing back to the point $P_1$ against the centripetal force (as observed outside the inertial frame). As the plunger of the solenoid is drawn back to $P_1$ against the 7017.078 N of force, the center of gravity (CG) and therefore the mass of the IDU (minus the mass of the plunger) will move toward the center of mass of the plunger of the solenoid. The timing of the energization of the field coil depends on the angular velocity of the rotor and the linear speed of the plunger, which is dependent on the centripetal force. For example, if the solenoid plunger travels 10 mm in one second and that distance is chosen to be the most effective to achieve a desired resultant force overall, then the voltage to that solenoid would be cut off one second before the time when it is necessary to re-engage the solenoid, in order to move the center of gravity with respect to the solenoid plunger.

Figure 6:
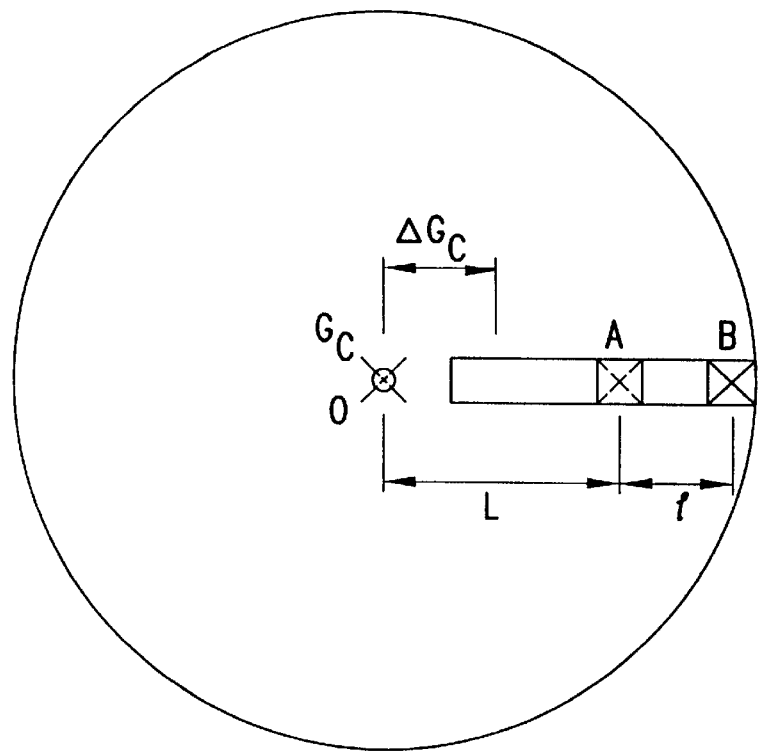
FIG. 6 is a schematic representation of the rotor with the positions of one plunger depicted.

FIG. 6 may be used to understand the motion of the center of gravity of the device. Once the solenoid plunger (shown at A) is displaced to the predetermined distance L from the center of the rotor, there results a certain magnitude of centripetal force. This force causes a reaction force on the axis of the rotor at O. The axis, which governs the motion of the vehicle moves in response to the reaction, causing a shifting of the center of gravity of the device as a whole. As the solenoid is de-energized and the plunger moves the distance 1 to the point B, the center of gravity also moves in the same direction as the solenoid piston. Whether the vehicle moves in response to the shifting of the plunger is determined by other forces on the axis. The ratchet mechanism 12 shown schematically in FIG. 2, is depicted in more detail in FIGS. 7A and 7B. It may be used to control the vehicle so that it moves in only one direction. As stated previously it is the belief of the inventor that the ratchet is not essential because the motion of the vehicle may also be controlled by the balance between the centripetal and Coriolis forces and the inertial force acting upon the whole unit. Where the inertial force predominates the center of gravity of the unit is believed to remain stationary. Otherwise, if the centripetal/Coriolis force exceeds the inertial force affecting the vehicle, then the center of gravity will be displaced (as the result of the electromagnetic force produced by the solenoid coils) in a direction opposite to the centrifugal/Coriolis force.

Figures 7A, 7B:
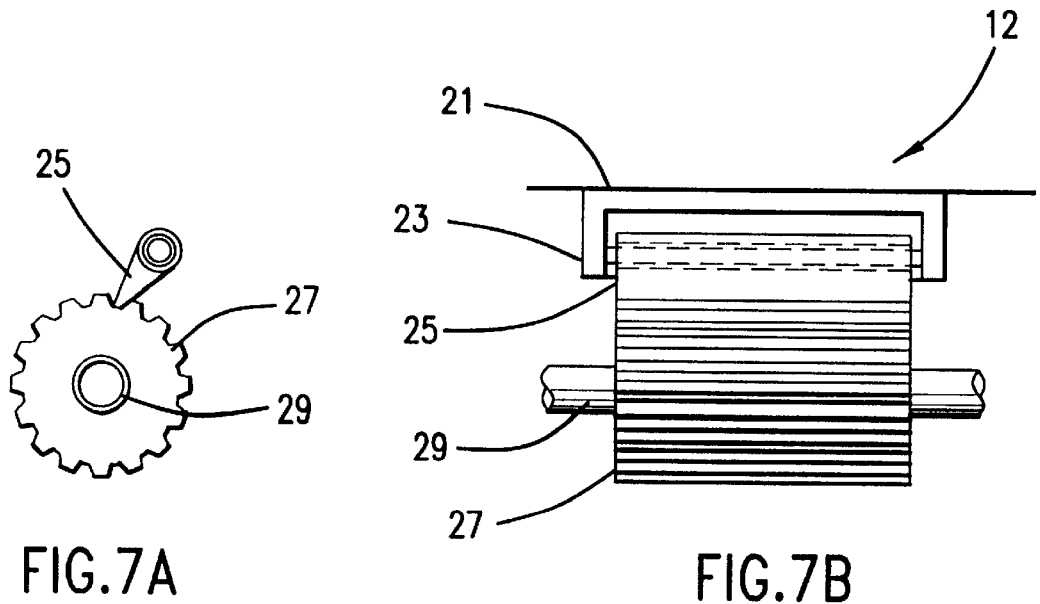
FIG. 7A is a side view of the ratchet mechanism components of the present invention.
FIG. 7B is a front view of the ratchet mechanism components of the present invention.

FIGS. 7A and 7B show a simple ratchet mechanism that may be used to restrain the direction of motion of the vehicle chassis 21, which is attached by a bracket 23 to the ratchet. The details of the attachment of the ratchet to the wheel of the mechanism is known to persons of ordinary skill. In particular, a latch or dog 25 engages a gear 27 locked to the vehicle wheel axle 29 to restrain the direction of rotation of the vehicle wheel.

Although the invention has been described in terms of specific embodiments, it is intended that the invention not be limited to those embodiments, but encompass the entire scope according to the following claims.

What is claimed is:

1. An inertial propulsion device for a vehicle comprising
   a motor having an energy source,
   an armature rotated about an axis by said motor, said armature having a period of rotation about said axis,
   a plurality of tracks on said armature, each track extending radially outwards from the axis,
   a plurality of weights, each weight riding on one of said plurality of tracks,
   a plurality of drivers that move the weights on said tracks,
   one or more controllers for said drivers to cause said drivers to move the radial position of the weights along the tracks,
   wherein the controllers cause each weight to move radially in a cycle whose period is the same as, or proportional to said period of rotation of said armature,
   said motion of the weights causing a net force on said axis in a predetermined direction during at least a portion of the cycle.

2. The inertial propulsion device for a vehicle of claim 1, wherein each said driver comprises
   a solenoid having a current determined by one of said controllers, wherein the current causes a motion of one of said weights along one of said tracks.

3. The inertial propulsion device for a vehicle of claim 2, wherein
   said controllers each comprise a sensor that detects the presence of one or more markers,
   said markers being located at predetermined locations on a ring concentric with the axis of said armature,
   said controllers each causing a driver to move weight to one of a set of predetermined position for the weights, said predetermined positions each having a fixed relationship to the location of said markers.

4. The inertial propulsion device for a vehicle of claim 3, further comprising
   a motion restrainer operating to impede the motion of the vehicle during at least a portion of the cycle during which the motion of the weights causes a net force on said axis in a direction other than said predetermined direction.

5. The inertial propulsion device for a vehicle of claim 2, further comprising
   a motion restrainer operating to impede the motion of the vehicle during at least a portion of the cycle during which the motion of the weights causes a net force on said axis in a direction other than said predetermined direction.

6. The inertial propulsion device for a vehicle of claim 1, further comprising
   a motion restrainer operating to impede the motion of the vehicle during at least a portion of the cycle during which the motion of the weights causes a net force on said axis in a direction other than said predetermined direction.

* * * * *